United States Patent [19]

MacGregor et al.

[11] Patent Number: 4,876,099

[45] Date of Patent: Oct. 24, 1989

[54] PROCESS FOR POPPING WILD RICE

[75] Inventors: Robert J. MacGregor; Darlene M. MacGregor; Arnold Lueck, all of Aitkin, Minn.

[73] Assignee: MacGregor Wild Rice Co., Aitkin, Minn.

[21] Appl. No.: 223,608

[22] Filed: Jul. 25, 1988

[51] Int. Cl.$^4$ .............................................. A21D 6/00
[52] U.S. Cl. .................................... 426/242; 426/450; 426/465; 426/466; 426/483
[58] Field of Search ............... 426/450, 447, 483, 242, 426/465, 466

[56] References Cited

U.S. PATENT DOCUMENTS

| | | | |
|---|---|---|---|
| 2,505,325 | 12/1950 | Hubbard | 426/466 |
| 3,512,989 | 5/1970 | Smith | 426/450 |
| 3,694,220 | 9/1972 | Pierce | 426/242 |
| 4,252,833 | 2/1981 | Zvonicek et al. | 426/242 |
| 4,478,862 | 10/1984 | Greethead | 426/450 |
| 4,522,837 | 6/1985 | Meinardus | 426/483 |

*Primary Examiner*—R. B. Penland
*Attorney, Agent, or Firm*—Orrin M. Haugen; Thomas J. Nikolai; Frederick W. Niebuhr

[57] ABSTRACT

Disclosed is the process for popping wild rice to make a puffy snack food or breakfast cereal which has a nutty flavor. The process includes curing, roasting and parching the wild rice in roasting ovens, sorting the wild rice into differing lengths and widths so it will have uniformity prior to popping, heating the wild rice on a conveying means at a temperature between 500°–800° F., and immediately removing the popped product to avoid scorching the product and creating a bad taste.

4 Claims, 1 Drawing Sheet

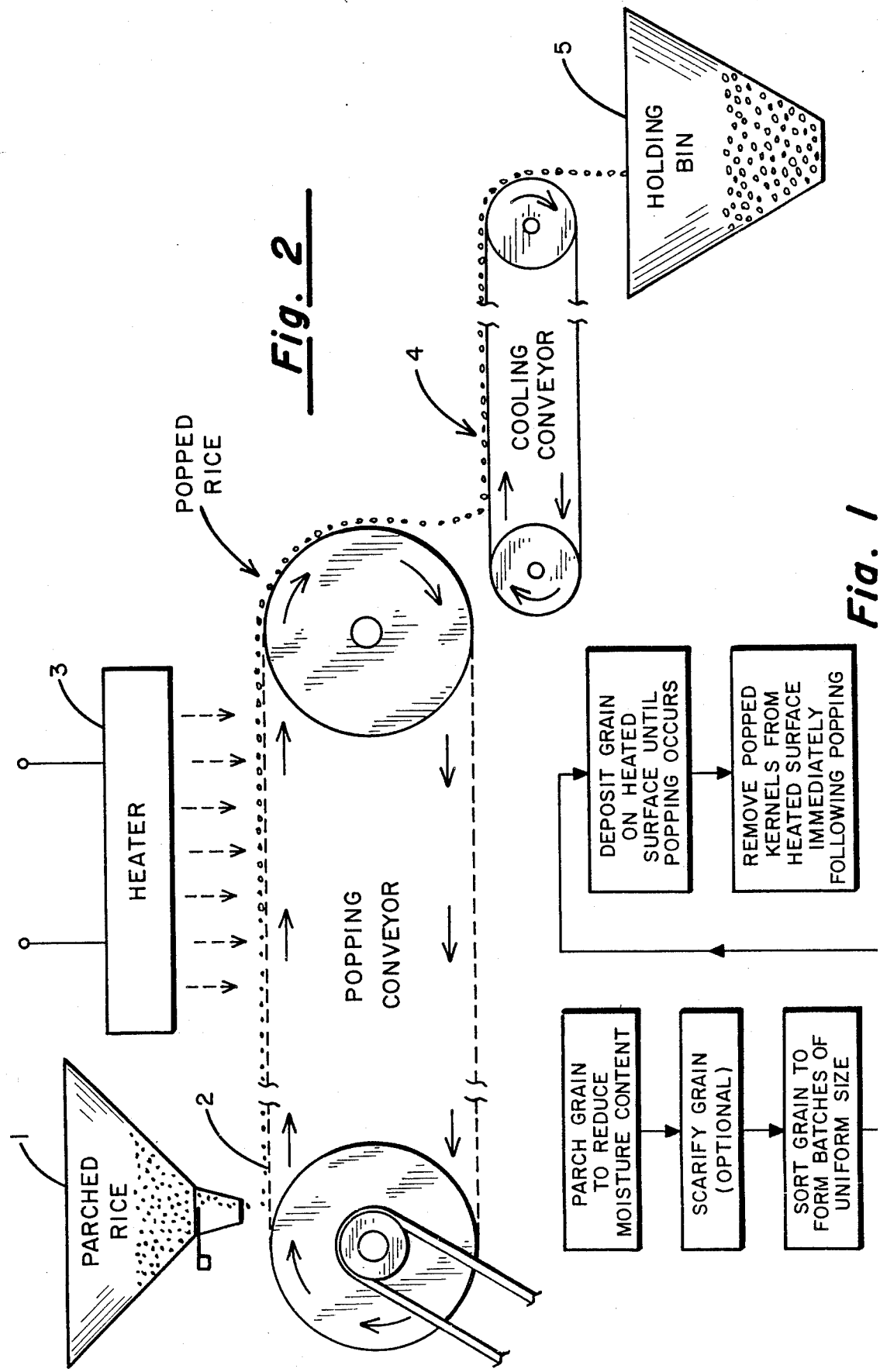

PROCESS FOR POPPING WILD RICE

BACKGROUND OF THE INVENTION

This invention relates to a process for treating wild rice. More specifically, it relates to a process for popping wild rice to form a snack food or breakfast cereal exhibiting a tasty nutty flavor.

Wild rice is indigenous to North America and is grown only in limited geographic areas. Many consider wild rice to be a delicacy and exclusive restaurants serve it with pride in a variety of ways as a house specialty.

The potential of processing wild rice to serve it as a natural snack food, however, has never been fully exploited. This is primarily due to the difficulties of working with wild rice on a commercial scale.

While others, in the past, have tried to develop processes to pop wild rice on a commercial scale to make an acceptable snack food, these processes have not been proven acceptable because they tend to be very expensive, complex or yield a product which is not wholly satisfactory.

For example, others have tried to pop wild rice using cooking oils. The residue of such oils left in the rice, however, contributed to undesirable flavors and additives. Various dry popping techniques are described in the following patents: U.S. Pat. Nos. 3,845,701 which issued on Nov. 5, 1974 to Sachnik, 1,631,145 which issued on June 7, 1927 to J. F. Nooman, 508,125 which issued on Nov. 7, 1893 to Jay White, 1,201,510 which issued on Oct. 17, 1916 to William Schuyler, 1,266,448 which issued on May 14, 1918 to Hazime Fukuda, and 3,411,430 which issued Nov. 19, 1968 to W. C. Rockwell. However, "dry" popping techniques developed for use in conjunction with other grains have not proven to be satisfactory for popping wild rice on a commercial scale.

Many difficulties are inherent in attempting to pop wild rice on a commercial scale. The major problems encountered when attempting to use the processes and tools described in the above-listed patents center upon the fact that much higher temperatures are required for a shortened exposure time when popping wild rice than when popping other grains, such as corn or even white rice.

BRIEF DESCRIPTION OF THE INVENTION

As described in further detail below, the present invention is comprised of an inexpensive, non-complex process for popping wild rice on a commercial scale to form a tasty, crisp, nutty product which can be used as a ready-to-eat snack food, a salad topping or a breakfast cereal. The popped wild rice can also be used in the cooking of soups, hot dishes or other entrees to improve their taste. What is truly exciting about the end product is that it is low in fat and sodium and has essentially no cholesterol. Further, the popped wild rice is high in protein and fiber and generally requires no additives or preservatives.

The subject invention relates to an improved process for producing popped wild rice on a commercial scale. It includes the steps of curing, roasting and parching the wild rice to reduce its moisture content. Next, the rice is passed through a scarification drum to remove part of the outer shell or bran from the rice kernels. While, depending upon the quality of the raw product, this step may not be necessary, it has proven beneficial in enhancing the taste and texture of the final product.

Following the scarification step, the grains are sized into differing lengths and widths so that the rice will have a desired uniformity prior to popping. The grains of uniform size are then deposited on a heated surface and their temperatures raised to a relatively high temperature in the range of 500°-800° F. Rapid heating of the moisture inside of the wild rice causes it to expand and pop the kernels. The high temperature makes it imperative that the time the popped wild rice remain on the heated surface be short. This is vitally important to avoid scorching and the creation of a bad taste. After the wild rice is popped, it is then permitted to cool prior to packaging.

BRIEF DESCRIPTION OF THE DRAWING

FIG. 1 is a flow diagram of the process comprising the preferred method of the present invention; and FIG. 2 discloses the apparatus used in the present invention to heat the wild rice grains to a very high temperature for a very short period of time.

DETAILED DESCRIPTION OF THE PREFERRED EMBODIMENT

The preferred process for popping wild rice is illustrated in FIG. 1 and is comprised of a plurality of steps. As indicated, it is first necessary to cure and parch the wild rice in roasting ovens. Harvested wild rice generally has a high moisture content. Not atypical is a moisture content in the range of 40% to 80% by weight. Successful popping of wild rice is possible when the moisture content of the rice is reduced by parching to a range of between 4-12% by weight.

Next, the parched wild rice is examined to determine whether its kernels still contain an outer shell or bran. If this is the case, it is generally desirable to pass the wild rice through a scarification drum to remove part of the outer shell or bran from the kernels. After the wild rice has been passed through the scarification drum, it is then sized (graded) into batches each of uniform but different lengths and widths so that the wild rice will have a desired size uniformity prior to popping.

Once the grains have been divided into varying sizes, grains of a given uniform size are rapidly heated for a short duration to a very high temperature of between 500°-800° F. so that they will pop. The popping occurs as a result of the rapid heating of the remaining moisture in the grain. The high temperatures recited makes it imperative that the time the popped kernels remain in communication with the heat surface be short. This is to avoid scorching of the popped wild rice and to prevent bad taste.

To obtain the required heating during a very short duration, we have found two techniques to be acceptable. The first is illustrated in FIG. 1. The uniform grains of parched and optionally scarified wild rice are distributed from a hopper 1 onto the conveyer 2. The conveyer then moves the wild rice over or beneath a heat source 3 which is operative to raise the temperature of the grain to between 500° F. and 800° F. The speed of the conveyor 2 is regulated so the wild rice remains in the heated area only for a time sufficient to allow it to pop, but not so long that the rice becomes scorched. Hence, a foul taste is not created. The popped wild rice is then transferred along conveyer 2 to a cooling station 4. Once cooled, the popped wild rice can be stored in a holding bin 5 for later packaging for distribution.

A second technique which has proven to be commercially suitable involves placing the wild rice grains of uniform size on a Syntron TM vibrating table. The vibrating table should be coated with a non-stick surface. The vibratory motion of the table will cause the wild rice grains to "march" across it so that the kernels will be subjected to sufficient heat for just enough time so they will pop, but not so long that they will be scorched.

Aside from producing a nutritious snack food, the above described technique greatly reduces the amount of time needed to cook the wild rice when it is to be served as a side dish or as part of a hot dish. Typically, wild rice is cooked by boiling it in water for about one hour. However, if the wild rice is first popped using the above described technique, this cooking time is reduced to about five minutes.

Still another important advantage of the above described technique is found when preparing and packaging wild rice on a commercial scale. Cooking the wild rice for one hour in boiling water and then allowing it to dry prior to packaging removes the flavor from the wild rice. It leaves with the water. However, if the wild rice is treated as described above, then cooked for five to ten minutes, the distinct flavor of the wild rice is not lost. The finished product not only retains its taste, but has the desired texture and appearance.

While the specification discloses a process for the treatment of wild rice to cause it to pop, variations and modifications of this process may be made without departing from the scope of the novel concepts of the present invention. Accordingly, the present invention is limited solely by the scope of the appended claims.

What is claim is:
1. A process for puffing wild rice comprising:
 (a) curing and parching the wild rice in a roasting oven to reduce its moisture content to a level of 4% to 12% by weight;
 (b) scarifying the wild rice to remove the outer shell and bran from the kernels of the wild rice;
 (c) grouping the wild rice by length and width so as to achieve a uniform size in each group;
 (d) depositing the groups of wild rice separately on a heating surface and exposing the wild rice in each group to heat the wild rice to 500-800 degrees fahrenheit so that the moisture in the wild rice expands, causing the wild rice to puff;
 (e) removing the wild rice from the heating surface after it has popped to avoid scorching; and
 (f) permitting the wild rice to cool.
2. The method of claim 1 wherein said heating surface is a conveyer and said heat is generated by an infrared energy source.
3. The method of claim 1 wherein said heating surface is a vibrating table having a non-stick surface, said table being adapted to vibrate causing the grains to move across the table at a rate which permits the wild rice to pop, but prevents it from scorching.
4. The method of claim 1 further including the step of cooking the wild rice in boiling water for five to ten minutes.

* * * * *